(12) United States Patent
Davies

(10) Patent No.: US 11,359,704 B2
(45) Date of Patent: Jun. 14, 2022

(54) LINEAR ACTUATOR

(71) Applicant: Goodrich Actuation Systems Limited, Solihull (GB)

(72) Inventor: Stephen Davies, Shrewsbury (GB)

(73) Assignee: GOODRICH ACTUATION SYSTEMS LIMITED, Solihull (GB)

( * ) Notice: Subject to any disclaimer, the term of this patent is extended or adjusted under 35 U.S.C. 154(b) by 0 days.

(21) Appl. No.: 15/949,142

(22) Filed: Apr. 10, 2018

(65) Prior Publication Data

US 2018/0298999 A1 Oct. 18, 2018

(30) Foreign Application Priority Data

Apr. 12, 2017 (EP) .................................... 17275048

(51) Int. Cl.
*F16H 25/22* (2006.01)
*F16H 25/20* (2006.01)
*B64C 9/36* (2006.01)

(52) U.S. Cl.
CPC ........... *F16H 25/2247* (2013.01); *B64C 9/36* (2013.01); *F16H 25/2015* (2013.01); *F16H 25/2261* (2013.01)

(58) Field of Classification Search
CPC ............. F16H 25/2015; F16H 25/2247; F16H 25/2261; F16H 25/2454; F16H 25/2266; F16H 25/2021; F16H 25/22; B64C 13/28; B64C 1/1446; B64C 1/1461; B64C 1/1407; B62D 29/06; B62D 29/08; E05F 15/622
USPC ...................... 74/424.91, 89.37, 89.23, 89.39
See application file for complete search history.

(56) References Cited

U.S. PATENT DOCUMENTS

| | | | | |
|---|---|---|---|---|
| 431,067 A | | 7/1890 | Lieb | |
| 2,637,550 A | * | 5/1953 | Ritter | .................... E05F 15/673 |
| | | | | 160/188 |
| 2,938,400 A | * | 5/1960 | Gondek | ............. F16H 25/2247 |
| | | | | 74/424.91 |
| 6,401,557 B1 | * | 6/2002 | Davies | .................... F02K 1/763 |
| | | | | 192/141 |

(Continued)

FOREIGN PATENT DOCUMENTS

| | | |
|---|---|---|
| EP | 2075488 A1 | 7/2009 |
| EP | 2390532 A1 | 11/2011 |

(Continued)

OTHER PUBLICATIONS

Extended European Search Report for International Application No. 17275048.1 dated Jan. 29, 2018, 9 pages.

(Continued)

*Primary Examiner* — Joseph Brown
(74) *Attorney, Agent, or Firm* — Cantor Colburn LLP

(57) ABSTRACT

A linear actuator includes: a screw shaft that has a screw thread and a longitudinal axis A and a nut movable along the screw shaft from a retracted position to an extended position. The actuator also includes a plurality of rollers movable with the nut, each of which includes a cylindrical surface configured to roll along one or more flanks of the screw thread, such that rotation of the screw shaft causes the rollers to roll along the flank(s) so that the nut translates in an axial direction along the screw shaft. The screw thread includes one or more detents (e.g., grooves) configured to lock the nut in one or more axial positions.

15 Claims, 3 Drawing Sheets

(56) References Cited

U.S. PATENT DOCUMENTS

| | | | |
|---|---|---|---|
| 2005/0141983 A1* | 6/2005 | Fujii | F16B 33/02 |
| | | | 411/308 |
| 2009/0133523 A1* | 5/2009 | Song | F16H 25/2247 |
| | | | 74/424.82 |
| 2011/0232407 A1* | 9/2011 | Verhagen | F16H 25/2261 |
| | | | 74/424.93 |
| 2012/0012425 A1 | 1/2012 | Hayase et al. | |
| 2012/0111669 A1* | 5/2012 | Hayase | B66F 9/08 |
| | | | 187/237 |
| 2012/0174691 A1* | 7/2012 | Yamada | B66F 9/08 |
| | | | 74/89.23 |
| 2012/0200009 A1* | 8/2012 | Verhagen | B62D 5/0445 |
| | | | 264/527 |
| 2013/0160583 A1 | 6/2013 | Kai et al. | |
| 2014/0338487 A1* | 11/2014 | Yamada | F16H 25/2261 |
| | | | 74/424.91 |
| 2015/0078879 A1 | 3/2015 | Vaughan et al. | |
| 2019/0106925 A1* | 4/2019 | McCorkell | E05F 15/622 |

FOREIGN PATENT DOCUMENTS

| | | |
|---|---|---|
| FR | 2920208 A1 | 2/2009 |
| WO | 2010034542 A1 | 4/2010 |

OTHER PUBLICATIONS

European Office Action for European Application No. 17275048.1, International Filing Date Apr. 12, 2017, dated Jun. 24, 2020, 6 pages.
First IN Examination Report for Application No. 201814011262, dated Sep. 9, 2021, 5 pages.

\* cited by examiner

LINEAR ACTUATOR

FOREIGN PRIORITY

This application claims priority to European Patent Application No. 17275048.1 filed Apr. 12, 2017, the entire contents of which is incorporated herein by reference.

FIELD

The present disclosure relates generally to linear actuators and in particular to linear actuators that generate a linear motion of an actuating component using rotation of a screw shaft.

BACKGROUND

Electrically driven actuators are known and used in various machines in order to drive a component. These typically involve the use of a screw shaft that rotates in order to translate a nut along the longitudinal axis of the screw shaft. Ballscrews are the default actuation mechanism of choice to translate rotary motion of a screw shaft into linear motion of the actuating component. Ballscrews are typically used due to their high efficiency levels as a result of rolling contact at the ball interface.

One application of a ballscrew is a power door opening system ("PDOS"), which is an independent system for opening, e.g., a nacelle cowl without the need for the aircraft to be hydraulically powered. One characteristic of such a system is that it always sees a compressive operational load. That is, the load on a PDOS always works against the motor of the actuator and pushes back on the actuating nut. The locking mechanism of a PDOS actuator is typically provided in the form of a complex, mechanically gated lock, which comprises a large number of moving parts located in the actuator which secures the actuator output at a discreet axial position.

It is desired to provide improvements to linear actuators, especially those that incorporate a compressive load, and also improvements to the locking mechanism of such linear actuators.

SUMMARY

In an aspect of the present disclosure, there is provided a linear actuator comprising a screw shaft, a nut and a plurality of rollers movable with the nut. The screw shaft comprises a screw thread and has a longitudinal axis. The nut is movable along the screw shaft from a retracted position to an extended position. The plurality of rollers each comprise a cylindrical surface configured to roll along one or more flanks of the screw thread, such that rotation of the screw shaft causes the rollers to roll along the flank(s) so that the nut translates in an axial direction along the screw shaft. The screw thread comprises one or more detents, each configured to cooperate with one of the plurality of rollers to lock the nut in one or more axial positions.

This arrangement provides a non-complex locking mechanism, due to the use of a simple detent on the screw shaft that cooperates with a roller. Further embodiments are described below and herein.

The one or more detents may be configured to prevent axial forces on the nut from moving the nut along the screw shaft when the nut is in the one or more axial positions.

Each detent may be provided in the form of a groove configured to receive one of the plurality of rollers.

Each groove may have a profile that prevents a respective roller from rolling back onto the screw thread upon application of a force to the nut in the axial direction.

Each groove may be shaped such that, upon application of a force to the nut in an axial direction (e.g., a direction of retraction of the nut), a respective roller is pressed against the surface of each groove (e.g., in the same direction) and is prevented from rolling back onto the screw thread by the opposing surface of the groove.

Each groove may have a shape substantially corresponding to the profile of a respective roller.

Each groove may have a profile corresponding to the cylindrical surface of a respective roller.

Each groove may have a curvature corresponding to the curvature of the cylindrical surface of a respective roller, such that when the roller falls into the groove in use, the cylindrical surface is flush with the surface of the groove.

The linear actuator may further comprise a motor configured to rotate the screw shaft in a first rotational direction to move the nut to its extended position, and in a second, opposite rotational direction to move the nut to its retracted position.

In various embodiments, in order to move the roller(s) out of the groove(s) and back onto the screw thread, it may be necessary to rotate the screw shaft, for example by applying a rotational driving force to a motor driving the screw shaft, e.g., in the second rotational direction (described below).

The screw thread may have a variable lead angle. This feature of the disclosure is considered to be advantageous in its own right, therefore an aspect of the disclosure provides a linear actuator comprising a screw shaft, a nut and a plurality of rollers movable with the nut. The screw shaft comprises a screw thread and has a longitudinal axis. The nut is movable along the screw shaft from a retracted position to an extended position. The plurality of rollers each comprise a cylindrical surface and are configured to roll along a respective flank of the screw thread, such that rotation of the screw shaft causes the rollers to roll along a respective flank so that the nut translates in an axial direction along the screw shaft, wherein the screw thread has a variable lead angle.

In any of the above aspects and embodiments involving a variable lead angle, the screw thread nearest a first end of the screw shaft may have a first lead angle, the screw thread nearest a second, opposite end of the screw shaft may have a second lead angle, and the first lead angle may be different to the second lead angle.

The lead angle of the screw thread may taper (e.g., gradually or with a constant taper) from the first end to the second end. The flank angle of the respective flank(s) may remain constant, whilst the lead angle varies.

The lead angle of the screw thread may be tailored to a particular load profile of the linear actuator. The load profile may correspond to a series of values representing the load resisting the actuation of the actuator (i.e., a compressive load, for example the load on the actuator of a power door opening system ("PDOS")) at particular axial locations of the nut. If the load on the actuator at a particular axial location of the nut is relatively large, then a relatively small lead angle may be provided at this axial location on the screw shaft. Similarly, if the load on the actuator at a particular axial location of the nut is relatively small, then a relatively large lead angle may be provided at this axial location on the screw shaft. In this manner, the variable lead angle may have an inverse relationship with the compressive load on the actuator.

BRIEF DESCRIPTION OF THE DRAWINGS

Various embodiments will now be described, by way of example only, and with reference to the accompanying drawings in which.

DETAILED DESCRIPTION

Figure 1:
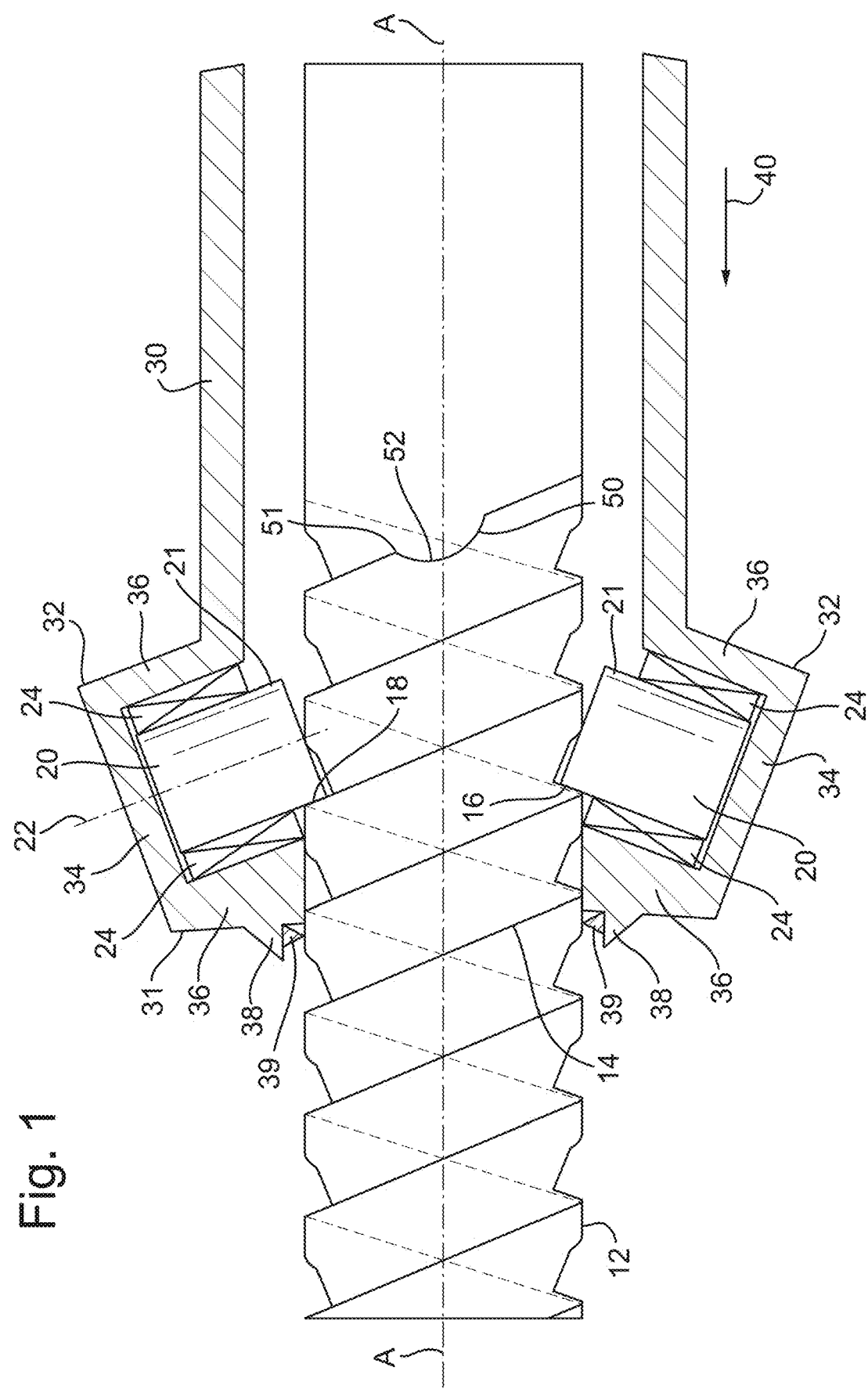
FIG. 1 shows an actuator in accordance with an embodiment of the present disclosure.

FIG. 1 shows a linear actuator 10 comprising a screw shaft 12, a plurality of rollers 20 and a translating nut 30. As will be described below, the nut 30 translates along the screw shaft 12 upon rotation of the screw shaft 12 and due to the interaction of the screw shaft 12 with each roller 20. It should be noted that the nut 30 is restricted from rotational movement, for example around the longitudinal axis A of the screw shaft 12.

During actuation the screw shaft 12 may rotate in a first rotational direction (e.g., one of clockwise and anticlockwise), and during retraction the screw shaft 12 may rotate in a second, opposite rotational direction (e.g., the other of clockwise and anticlockwise).

The screw shaft 12 comprises a screw thread 14 on its outer cylindrical surface. This is shown schematically in FIG. 1, in that only a portion of the screw thread 14 can be seen, but it will be appreciated that this screw thread 14 may extend along the entire length of the screw shaft 12, such that the nuts 30 is translatable along the entire length. The screw thread 14 is helically formed around the longitudinal axis A of the screw shaft 12.

Each roller 20 is configured to rotate about a roller axis 22 which may coincide with a flank angle of the respective flank 16, 18. Each roller 20 is held within a roller housing 32 of the nut 30. Any number of rollers 20 may be provided (e.g., as a function of load distribution), each being held within a roller housing 32, which may be common to each of the rollers 20.

The number of rollers 20 is governed by the application at hand, but it is thought that as few as possible should be provided. In order to provide a balanced load, however, at least two rollers 20 may be provided (as shown in FIG. 1), but three, four or six rollers may be provided and spaced symmetrically about the longitudinal axis A of the screw shaft 12.

As can be seen from FIG. 1, each roller 20 comprises a cylindrical surface 21 that rolls along a respective flank 16, 18 of the screw thread 14 as the roller 20 rotates about its roller axis 22. Each of the rollers 20 can be configured to run on a single continuous flank (e.g., a single start thread), or be distributed across a plurality of continuous and different flanks, for example, 2, 3, 4 or 6 start threads. In FIG. 1, for example, a first of the rollers moves along flank 16, and a second of the rollers moves along a second flank 18.

The roller housing 32 may comprise a base portion 34 and two side portions 36, within which each roller 20 sits. Suitable bearings 24 are provided to allow the rollers 20 to rotate within the housing 32 and hold the rollers 20 in position within the housing 32. Thrust bearings (not shown) may be provided to prevent movement of the rollers 20 in a direction along the roller axis 22.

Upon rotation of the screw shaft 12 in its actuation direction, rollers 20 ride along their respective flanks 16, 18, which causes the nut 30 to move along the screw shaft 12, i.e., in an direction parallel to the longitudinal axis A of the screw shaft 12. It will be appreciated that anticlockwise movement of the screw shaft 12 shown in FIG. 1 will cause axial movement of the nut 30. However, the screw thread 14 may be oriented differently such that clockwise movement of the screw shaft 12 causes axial movement of the nut 30.

In order to retract the nut 30 it is necessary to apply a load in the direction of arrow 40. This is because rotation of the screw shaft 12 in the direction opposite to its actuation direction would not, by itself, result in a force applied to the rollers 20. Certain systems, such as a power door opening system ("PDOS") on an aircraft, inherently exert a force in this direction, known as a compressive load. In order to retract the nut 30 in such systems, the driving force that causes rotation of the screw shaft 12 in its actuation direction simply needs to be controlled by a motor (e.g., motor 60 in FIG. 2) to achieve the desired retraction speed or speed profile.

In accordance with the present disclosure, one or more detents are provided on the screw thread 14 that are configured to lock the nut 30 in a particular axial position. The detent may be a catch, hook, or other device. As shown in the illustrated embodiments, the detents may be in the form of a groove 50 configured to receive a roller 20, such that the roller 20 will fall into the groove upon extension of the nut 30, for example to its desired maximum extension along the screw shaft 12.

The locking referred to with respect to the detents may be against axial forces applied to the nut, and not, for example, rotational forces applied to the screw shaft. As discussed below, the detents may be provided in order to prevent axial forces on the nut from rotating the screw shaft, thereby extending or retracting the nut.

A detent (e.g., groove) may be provided for each roller 20. For example, and in the embodiment of FIG. 1, two grooves 50 may be provided such that each roller 20 is configured to fall into a respective groove 50 upon extension of the nut 30, for example to its desired maximum extension along the screw shaft 12.

The one or more grooves 50 may be machined into each flank 16, 18 of the screw shaft 12. The groove 50 may be configured such that the roller 20 may not be able to move out of the groove upon an applied load in the direction of arrow 40 and/or upon application of a force to the nut 30 in the direction of arrow 40 (i.e., the axial direction). This locks the nut 30 in position, for example at its desired maximum extension along the screw shaft 12.

It will be appreciated that the location of the detents may not be (or may not only be) at the maximum extension of the nut 30, but any number of detents could also be provided at any desired axial position along the screw shaft 12, in order to provide a locking function at one or more axial positions.

In various embodiments, a set of detents (e.g., grooves) may be provided at a plurality of axial positions along the screw shaft, wherein each set of detents is configured to lock the nut 30 in a particular axial position. Each detent in a set of detents may correspond to a respective roller, and the number of detents in each set of detents may be equal to the number of rollers.

Referring back to FIG. 1, a flange 38 may be located at a first end 31 of the nut 30, which flange 38 extends circumferentially around the screw shaft 12. A seal 39 may be located on a radially inner surface of the flange 38 (radial in this regard relative to the longitudinal axis A of the screw shaft 12), and may be configured to provide a fluid seal between the nut 30 and the screw shaft 12.

Figure 2:
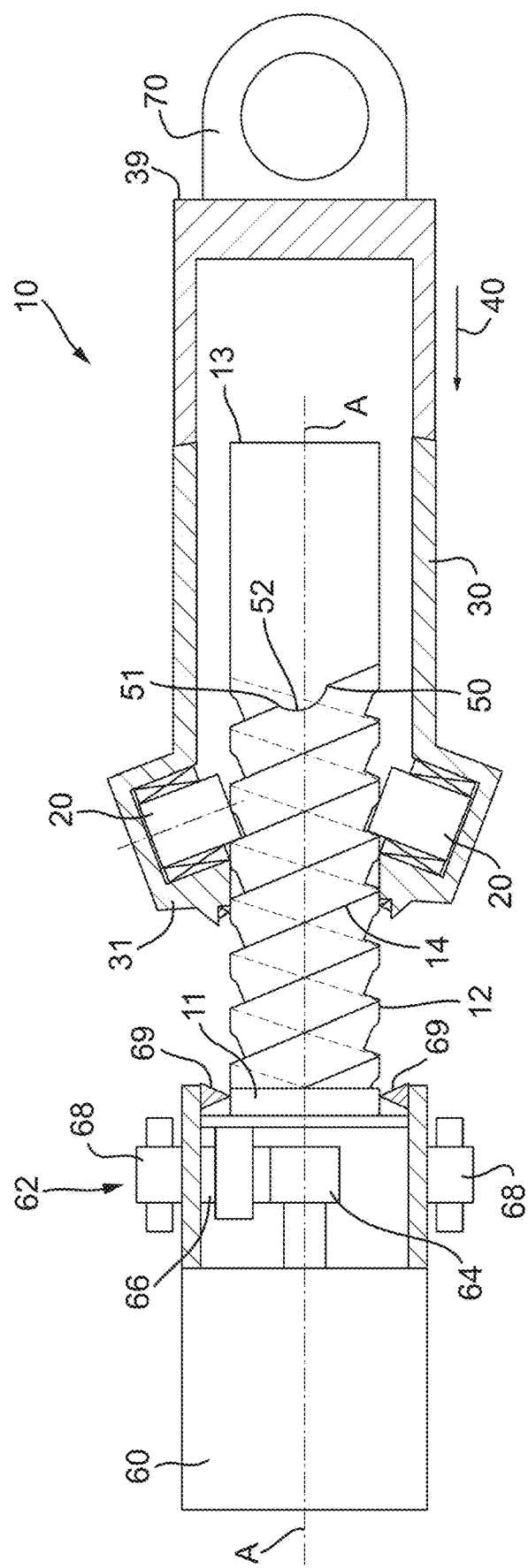
FIG. 2 shows the actuator of FIG. 1 including a motor and an actuating component.

FIG. 2 shows a wider view of the linear actuator 10, which further comprises a motor 60 operatively connected to an end 11 of the screw shaft 12. The motor 60 comprises an optional planetary gear system 62, which is schematically shown as including a sun gear 64, a plurality of planet gears 66 and a fixed ring gear 68. The motor drive is connected to the sun gear 64. Upon rotation of the motor drive, the sun gear 64 rotates, causing the planet gears 66 to rotate about the longitudinal axis A of the screw shaft 12 (which is also the longitudinal axis of the motor drive) due to their engagement with the fixed ring gear 68. The rotation of the planet gears 66 causes a corresponding rotation of the screw shaft 12.

An actuating member 70 may be connected to a second end 39 of the nut 30 opposite to the first end 31, and may be attachable to a load (for example, a compressive load) for actuating a component such as a power door opening system.

The motor 60 may be configured to rotate the screw shaft 12 in both a clockwise and/or anticlockwise direction. A seal 69 may be provided between the housing of the motor 60 and the screw shaft 12, for example to prevent ingress of fluid into the planetary gear system 62.

As discussed above, one or more detents are provided on the screw thread 14 in order to provide a locking function that prevents a compressive load (e.g., in the direction of arrow 40) from retracting the nut 30 and actuating member 70. Typically in ballscrew applications such a locking function (i.e., preventing an actuator from retracting under a compressive load) may be provided using a mechanical lock, such as a mechanically gated lock. The use of rollers 20 interacting with detents as described herein means that there is no requirement for a movable lock members, for example movable tine fingers, as is the case with conventional arrangements.

In the illustrated embodiment the detents are in the form of grooves 50. When a roller 20 is located in a groove 50, any force that pushes the roller 20 in the direction of arrow 40 (i.e., in the axial direction) results in the roller 20 being pressed against the surface 52 of the groove 50. Due to the profile of the groove 50, the roller 20 cannot roll back onto the screw thread 14 upon an applied load in this direction. As such, the roller 20, and the nut 30 are locked in position.

Each groove 50 may have a profile (e.g., shape) that substantially corresponds to the profile of the rollers 20, for example the cylindrical surface 21 thereof. However, any suitable shape of groove 50 may be used to achieve the function of locking the rollers 20 in position, for example parabolic, circular or triangular.

In order to move the rollers 20 out of the grooves 50, it is necessary to rotate the screw shaft 12. If it is desired to move the nut 30 further in the actuation direction, then continued rotation of the screw shaft 12 in the first rotational direction (e.g., using a driving force from the motor 60) is necessary. If it is desired to retract the nut 30, then a small rotation of the screw shaft in the second rotational direction using a reverse driving force of the motor 60 is necessary in order to move the roller 20 past a lip 51 of the groove 50.

Once the roller 20 has moved over the lip 51, the rotational driving force may be relaxed, and the load applied in the direction of arrow 40 (e.g., a compressive load) can then cause the rollers 20 to roll in a reverse direction along the screw thread 14, thereby retracting the nut 30.

In various embodiments, the screw shaft 12 may incorporate a screw thread 14 having a variable, as opposed to fixed lead angle. For example, the screw thread 14 nearest the end 11 of the screw shaft 12 (i.e., closest to the motor) may have a first, relatively large lead angle, and the screw thread 14 nearest the opposite end 13 of the screw shaft 12 (i.e., furthest from the motor 60 and closest to the actuating member 70) may have a second, relatively small lead angle.

In various embodiments, the lead angle of the screw thread 14 may be tailored to a particular load profile, e.g., the magnitude of the load in the direction of arrow 40 as the nut 30 translates along the screw shaft 12. For example, if the strength of the load in the direction of arrow 40 decreases gradually as the nut 30 moves from its retracted position to its extended position, the lead angle of the screw thread 14 may decrease gradually from one end 11 of the screw shaft 12 (corresponding to the position of the rollers 20 when the nut 30 is in its retracted position) to the other end 13 of the screw shaft 12 (corresponding to the position of the rollers 20 when the nut 30 is in its extended position).

Figure 3:
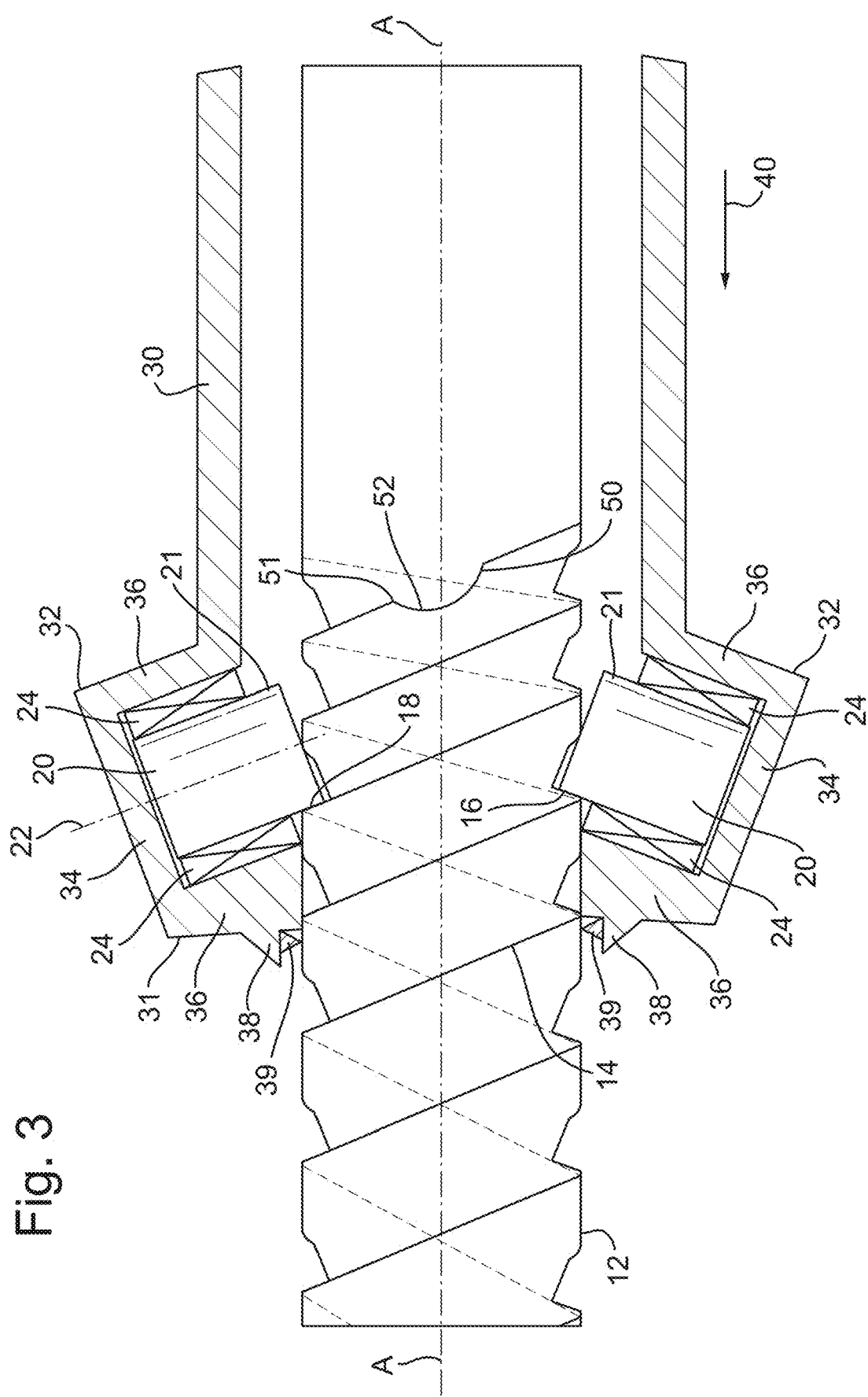
FIG. 3 shows a modification of the actuator of FIG. 1 having a variable lead angle.

An example of a screw shaft 12 having a variable lead angle is shown in FIG. 3, which (schematically) depicts the lead angle of the screw thread 14 decreasing as one moves to the right in FIG. 3. It should be noted that the flank angle, i.e., the angle of the flank upon which the rollers travel, does not change, and stays substantially constant as the lead angle changes from one end of the screw shaft 12 to the other.

Other embodiments are envisaged in which the profile of the compressive load is non-linear, and the lead angle of the screw thread 14 may be tailored accordingly. For example, when the compressive load is relatively large, the lead angle may be relatively small, and when the compressive load is relatively small, the lead angle may be relatively large.

A variable lead angle may be provided in this manner due to the compressive load in the direction of arrow 40 changing depending on the axial position of the nut 30. For example, it may be that upon full extension of the actuator the compressive load is relatively large, and upon retraction of the actuator the compressive load is relatively small. As such, less force may be required to retract the nut 30 (i.e., move the rollers 20 along the screw thread 14) when the nut 30 is in its extended position, meaning that a relatively small lead angle is appropriate here. An increased force may be required to retract the nut 30 when the nuts 30 is in a more retracted position, meaning that a relatively large lead angle is appropriate here.

In the case of a variable lead angle screw, the embodiments are typically limited to a number of rollers 20 that equals the number of starts or flanks on the screw thread, wherein each roller 20 moves along a different flank. The lead angle of each start or flank typically has to change substantially equally as one moves along the screw shaft 12, so that the rollers 20 may experience substantially the same lead angle at any given axial position of the nut 30.

In any of the aspects or embodiments described herein, the linear actuator may be part of a system, e.g., a power door operating system ("PDOS"), and may be configured to actuate a component, e.g., a door such as a nacelle cowl of an aircraft. The system may involve a compressive load on the actuator, meaning that a constant axial force is applied to the nut in the direction of arrow 40. The compressive load may change depending on the axial position of the nut. For example, when the nut is retracted the compressive load or axial force on the nut (i.e., in the direction of arrow 40 in FIGS. 1 and 2) may be relatively small, and when the nut is extended the compressive load or axial force on the nut may be relatively large. A variable lead angle may be provided on the screw thread to take account of this, as discussed above.

Although the present invention has been described with reference to preferred embodiments, it will be understood by those skilled in the art that various changes in form and detail may be made without departing from the scope of the invention as set forth in the accompanying claims.

The invention claimed is:

1. A power door operating system of an aircraft comprising:
   a linear actuator, wherein the linear actuator is configured to actuate a component and includes:
   a screw shaft comprising a screw thread and having a longitudinal axis;
   a nut movable along the screw shaft from a retracted position to an extended position; and
   a plurality of rollers movable with the nut, each comprising a cylindrical surface configured to roll along one or more flanks of the screw thread, such that rotation of the screw shaft causes the rollers to roll along the one or more flanks so that the nut translates in an axial direction along the screw shaft;
   wherein the screw thread comprises one or more detents configured to lock the nut in one or more axial positions, and the rollers rotate about a roller axis, wherein the roller axis of each of the rollers is at a non-perpendicular angle relative to the longitudinal axis of the screw shaft, the non-perpendicular angle being the same for each roller, and a compressive force exerted on the linear actuator by the component of the power door system pushes the cylindrical surface of each of the rollers against the one or more flanks, and
   wherein the component of the power door operating system is configured to exert the compressive force on the linear actuator in the direction of the longitudinal axis, wherein the compressive force always acts in the direction of the longitudinal axis throughout an entire range of movement of the linear actuator, and is such that when the nut is fully retracted the compressive force is at a minimum and when the nut is fully extended the compressive force is at a maximum, and the one or more detents are configured to prevent the compressive force from retracting the nut;
   wherein the rollers are all slanted in the same direction towards the longitudinal axis of the linear actuator.

2. The power door operating system of claim 1, wherein the one or more detents are configured to prevent said compressive force from moving the nut along the screw shaft when the nut is in said one or more axial positions.

3. The power door operating system of claim 1, wherein each of the one or more detents is provided in the form of one or more grooves configured to receive one of the plurality of rollers.

4. The power door operating system of claim 3, wherein each of the one or more grooves has a profile that prevents a respective roller from rolling back onto the screw thread upon application of the compressive force to the nut in the axial direction.

5. The power door operating system of claim 3, wherein each of the one or more grooves is shaped such that, upon application of the compressive force to the nut in the axial direction, a respective roller is pressed against a surface of each groove and is prevented from rolling back onto the screw thread.

6. The power door operating system of claim 3, wherein in order to move one or more of the rollers out of the one or more grooves and back onto the screw thread against the action of the compressive force, it is necessary to rotate the screw shaft.

7. The power door operating system of claim 3, wherein each of the one or more grooves has a shape substantially corresponding to a profile of a respective roller.

8. The power door operating system as claimed in claim 7, wherein each of the one or more grooves has a profile corresponding to the cylindrical surface of a respective roller.

9. The power door operating system of claim 8, wherein each of the one or more grooves has a curvature corresponding to a curvature of the cylindrical surface of a respective roller, such that when the roller falls into the groove in use, the cylindrical surface is flush with the surface of the groove.

10. The power door operating system of claim 1, wherein the linear actuator further includes: a motor configured to rotate the screw shaft in a first rotational direction to move the nut to its extended position, and in a second rotational direction to move the nut to its retracted position, wherein:
    the first rotational direction is opposite to the second rotational direction;
    the motor is configured to rotate the screw shaft in the first rotational direction in order to move the rollers out of a respective groove and move the nut further in an actuation direction; and
    the motor is configured to rotate the screw shaft in the second rotational direction in order to move the rollers out of a respective groove and retract the nut.

11. The power door operating system of claim 1, wherein the component is a door of an aircraft.

12. The power door operating system of claim 1, wherein the component is a nacelle cowl of an aircraft.

13. The power door operating system of claim 1, wherein the rollers are all urged against the one or more flanks of the screw thread in the same direction as the compressive force.

14. The power door operating system of claim 1, wherein the non-perpendicular angle is defined relative to the direction of the compressive force along the longitudinal axis.

15. The power door operating system of claim 1, wherein the rollers are slanted as aforesaid such that the roller axis of each roller is tilted in the direction of the compressive force along the longitudinal axis.

* * * * *